US011724814B2

(12) United States Patent
Kupiszewski et al.

(10) Patent No.: US 11,724,814 B2
(45) Date of Patent: *Aug. 15, 2023

(54) EMBEDDED ELECTRIC MACHINE

(71) Applicant: General Electric Company, Schenectady, NY (US)

(72) Inventors: Thomas Kupiszewski, Liberty Township, OH (US); Brandon Wayne Miller, Liberty Township, OH (US); Daniel Alan Niergarth, Cincinnati, OH (US); Randy M. Vondrell, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,752

(22) Filed: Jan. 10, 2022

(65) Prior Publication Data
US 2022/0289394 A1 Sep. 15, 2022

Related U.S. Application Data

(63) Continuation of application No. 16/366,453, filed on Mar. 27, 2019, now Pat. No. 11,247,779, which is a
(Continued)

(51) Int. Cl.
*B64D 27/24* (2006.01)
*F01D 15/10* (2006.01)
(Continued)

(52) U.S. Cl.
CPC ............. *B64D 27/24* (2013.01); *B64D 27/12* (2013.01); *F01D 15/10* (2013.01); *F01D 25/183* (2013.01);
(Continued)

(58) Field of Classification Search
CPC ..... F02C 7/24; F02K 3/06; F02K 5/00; F04D 19/02; F04D 25/06; F01D 15/10; F01D 25/183; H02K 1/27; H02K 7/1823
See application file for complete search history.

(56) References Cited

U.S. PATENT DOCUMENTS 2,812,912 A   11/1957   Stevens et al.
3,286,470 A   11/1966   Gerlaugh
(Continued)

FOREIGN PATENT DOCUMENTS

EP   3048042 A1   7/2016
GB   2489311 A    9/2012
(Continued)

OTHER PUBLICATIONS

Http://aviationweek.com/awin/boeing-researches-alternative-propulsion-and-fuel-options, Aviation Week & Space Technology, Jun. 4, 2012.
(Continued)

*Primary Examiner* — Sean Gugger
(74) *Attorney, Agent, or Firm* — Dority & Manning, P.A.

(57) ABSTRACT

A gas turbine engine includes a compressor section and a turbine section together defining a core air flowpath. Additionally, a rotary component is rotatable with at least a portion of the compressor section and at least a portion of the turbine section. An electric machine is mounted coaxially with the rotary component and positioned at least partially inward of the core air flowpath along a radial direction of the gas turbine engine. A cavity wall defines at least in part a buffer cavity surrounding at least a portion of the electric machine to thermally insulate the electric machine, e.g., from the relatively high temperatures within the core air flowpath.

20 Claims, 9 Drawing Sheets

Related U.S. Application Data continuation of application No. 15/242,789, filed on Aug. 22, 2016, now Pat. No. 10,308,366.

(51) Int. Cl.

| | | |
|---|---|---|
| *F01D 25/18* | (2006.01) | |
| *F02K 5/00* | (2006.01) | |
| *F04D 25/06* | (2006.01) | |
| *F02C 7/32* | (2006.01) | |
| *B64D 27/12* | (2006.01) | |
| *F02C 7/24* | (2006.01) | |
| *F02K 3/06* | (2006.01) | |
| *F04D 19/02* | (2006.01) | |
| *H02K 1/27* | (2022.01) | |
| *H02K 7/18* | (2006.01) | |
| *B64D 27/02* | (2006.01) | |

(52) U.S. Cl.
CPC ............... *F02C 7/24* (2013.01); *F02C 7/32* (2013.01); *F02K 3/06* (2013.01); *F02K 5/00* (2013.01); *F04D 19/02* (2013.01); *F04D 25/06* (2013.01); *H02K 1/27* (2013.01); *H02K 7/1823* (2013.01); *B64D 2027/026* (2013.01); *F05D 2220/323* (2013.01); *F05D 2220/768* (2013.01); *F05D 2260/98* (2013.01)

(56) References Cited

U.S. PATENT DOCUMENTS

| | | | |
|---|---|---|---|
| 3,312,448 A | | 4/1967 | Hull, Jr. et al. |
| 3,485,442 A | * | 12/1969 | Mitchener ................. F02C 7/24 415/143 |
| 3,844,110 A | | 10/1974 | Widlansky et al. |
| 4,089,493 A | | 5/1978 | Paulson |
| 4,370,560 A | | 1/1983 | Faulkner et al. |
| 4,605,185 A | | 8/1986 | Reyes |
| 4,645,415 A | | 2/1987 | Hovan et al. |
| 4,913,380 A | | 4/1990 | Verdaman et al. |
| 5,174,109 A | | 12/1992 | Lampe |
| 5,285,123 A | * | 2/1994 | Kataoka ................. F01D 15/10 290/52 |
| 5,781,007 A | | 7/1998 | Partika et al. |
| 5,793,137 A | * | 8/1998 | Smith .................... H02K 21/48 310/114 |
| 5,799,484 A | | 9/1998 | Nims |
| 5,927,644 A | | 7/1999 | Ellis et al. |
| 6,105,697 A | | 8/2000 | Weaver |
| 6,169,332 B1 | | 1/2001 | Taylor et al. |
| 6,545,373 B1 | | 4/2003 | Andres et al. |
| 6,834,831 B2 | | 12/2004 | Daggett |
| 6,976,655 B2 | | 12/2005 | Thompson |
| 6,992,403 B1 | | 1/2006 | Raad |
| 7,251,942 B2 | | 8/2007 | Dittmar et al. |
| 7,267,300 B2 | | 9/2007 | Heath et al. |
| 7,285,871 B2 | | 10/2007 | Derouineau |
| 7,380,749 B2 | | 6/2008 | Fucke et al. |
| 7,387,189 B2 | | 6/2008 | James et al. |
| 7,398,641 B2 | * | 7/2008 | Stretton ................. F02C 7/047 244/134 B |
| 7,417,337 B1 | | 8/2008 | Suttie |
| 7,493,754 B2 | | 2/2009 | Moniz et al. |
| 7,495,354 B2 | | 2/2009 | Herrmann |
| 7,514,810 B2 | | 4/2009 | Kern et al. |
| 7,528,499 B2 | | 5/2009 | Suttie |
| 7,665,689 B2 | | 2/2010 | McComb |
| 7,677,502 B2 | | 3/2010 | Lawson et al. |
| 7,752,834 B2 | | 7/2010 | Addis |
| 7,806,363 B2 | | 10/2010 | Udall et al. |
| 7,818,969 B1 | | 10/2010 | Hotto |
| 7,819,358 B2 | | 10/2010 | Belleville |
| 7,905,449 B2 | | 3/2011 | Cazals et al. |
| 7,952,244 B2 | | 5/2011 | Colin |
| 7,958,727 B2 | | 6/2011 | Arnold |
| 7,970,497 B2 | | 6/2011 | Derouineau et al. |
| 7,976,273 B2 | | 7/2011 | Suciu et al. |
| 8,016,228 B2 | | 9/2011 | Fucke et al. |
| 8,026,624 B2 | | 9/2011 | Beutin et al. |
| 8,033,094 B2 | | 10/2011 | Suciu et al. |
| 8,039,983 B2 | | 10/2011 | Cote et al. |
| 8,099,944 B2 | | 1/2012 | Foster et al. |
| 8,109,073 B2 | | 2/2012 | Foster et al. |
| 8,128,019 B2 | | 3/2012 | Annati et al. |
| 8,141,360 B1 | | 3/2012 | Huber |
| 8,162,254 B2 | | 4/2012 | Roche |
| 8,193,761 B1 | | 6/2012 | Singh |
| 8,220,739 B2 | | 7/2012 | Cazals |
| 8,226,040 B2 | | 7/2012 | Neto |
| 8,291,716 B2 | | 10/2012 | Foster et al. |
| 8,317,126 B2 | | 11/2012 | Harris et al. |
| 8,432,048 B1 | | 4/2013 | Paulino |
| 8,469,306 B2 | | 6/2013 | Kuhn, Jr. |
| 8,489,246 B2 | | 7/2013 | Dooley |
| 8,492,920 B2 | * | 7/2013 | Huang ...................... H02P 9/00 290/52 |
| 8,522,522 B2 | * | 9/2013 | Poisson ................... F01D 15/10 60/39.093 |
| 8,549,833 B2 | | 10/2013 | Hyde et al. |
| 8,552,575 B2 | | 10/2013 | Teets et al. |
| 8,568,938 B2 | | 10/2013 | Gao et al. |
| 8,596,036 B2 | | 12/2013 | Hyde et al. |
| 8,631,657 B2 | | 1/2014 | Hagen et al. |
| 8,640,439 B2 | | 2/2014 | Hoffjann et al. |
| 8,657,227 B1 | | 2/2014 | Bayliss et al. |
| 8,672,263 B2 | | 3/2014 | Stolte |
| 8,684,304 B2 | | 4/2014 | Burns et al. |
| 8,692,489 B2 | | 4/2014 | Maalioune |
| 8,723,349 B2 | | 5/2014 | Huang et al. |
| 8,723,385 B2 | | 5/2014 | Jia et al. |
| 8,742,605 B1 | | 6/2014 | Wilhide et al. |
| 8,836,160 B1 | | 9/2014 | Paterson et al. |
| 8,857,191 B2 | | 10/2014 | Hyde et al. |
| 8,890,343 B2 | | 11/2014 | Bulin et al. |
| 8,925,660 B2 | | 1/2015 | Bowdich et al. |
| 8,928,166 B2 | | 1/2015 | Seger et al. |
| 8,939,399 B2 | | 1/2015 | Kouros et al. |
| 8,950,703 B2 | | 2/2015 | Bayliss et al. |
| 8,957,539 B1 | | 2/2015 | Ralston |
| 8,997,493 B2 | * | 4/2015 | Brust ..................... H02K 7/1823 60/698 |
| 8,998,580 B2 | | 4/2015 | Quiroz-Hernandez |
| 9,004,849 B2 | | 4/2015 | Munsell et al. |
| 9,038,398 B2 | | 5/2015 | Suciu et al. |
| 9,045,996 B2 | | 6/2015 | Anghel et al. |
| 9,059,440 B2 | | 6/2015 | Hotto |
| 9,068,562 B1 | | 6/2015 | Budica et al. |
| 9,143,023 B1 | | 9/2015 | Uskert |
| 9,190,892 B2 | | 11/2015 | Anthony |
| 2006/0037325 A1 | | 2/2006 | Peters et al. |
| 2006/0138779 A1 | | 6/2006 | Bouiller et al. |
| 2007/0217905 A1 | * | 9/2007 | Bouiller ................. F01D 9/065 415/122.1 |
| 2007/0230127 A1 | | 10/2007 | Peugh et al. |
| 2008/0056892 A1 | | 3/2008 | Barton et al. |
| 2008/0143115 A1 | * | 6/2008 | Kern ...................... F01D 15/10 290/52 |
| 2009/0179424 A1 | | 7/2009 | Yaron |
| 2010/0038473 A1 | | 2/2010 | Schneider et al. |
| 2010/0247297 A1 | * | 9/2010 | Legare .................. F01D 11/24 415/173.1 |
| 2011/0016882 A1 | | 1/2011 | Woelke et al. |
| 2011/0024567 A1 | * | 2/2011 | Blackwelder .......... B64D 15/12 244/134 D |
| 2012/0025676 A1 | | 2/2012 | Poisson |
| 2012/0119020 A1 | | 5/2012 | Burns et al. |
| 2012/0153076 A1 | | 6/2012 | Burns et al. |
| 2012/0209456 A1 | | 8/2012 | Harmon et al. |
| 2012/0214605 A1 | | 8/2012 | Snook et al. |
| 2013/0032215 A1 | | 2/2013 | Streifinger |
| 2013/0036730 A1 | | 2/2013 | Bruno et al. |
| 2013/0052005 A1 | | 2/2013 | Cloft |
| 2013/0062885 A1 | | 3/2013 | Taneja |
| 2013/0088019 A1 | | 4/2013 | Huang et al. |

(56) References Cited

U.S. PATENT DOCUMENTS

| | | |
|---|---|---|
| 2013/0094963 A1 | 4/2013 | Rolt |
| 2013/0098066 A1* | 4/2013 | Gallet .................. F02K 3/062 |
| | | 60/796 |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0060995 A1 | 3/2014 | Anderson et al. |
| 2014/0079530 A1* | 3/2014 | Ferch .................... F02C 7/12 |
| | | 415/1 |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0256051 A1* | 9/2015 | Hippen ................ F01D 25/145 |
| | | 60/605.1 |
| 2015/0380999 A1 | 12/2015 | Joshi et al. |
| 2016/0061053 A1 | 3/2016 | Thomassin |
| 2016/0149469 A1* | 5/2016 | Lemmers ............... H02K 7/116 |
| | | 290/1 A |
| 2016/0214727 A1 | 7/2016 | Hamel et al. |
| 2017/0267370 A1 | 9/2017 | Ullyott et al. |
| 2018/0050807 A1 | 2/2018 | Kupiszewski et al. |
| 2018/0051701 A1 | 2/2018 | Kupiszewski et al. |
| 2018/0051702 A1 | 2/2018 | Kupiszewski et al. |

FOREIGN PATENT DOCUMENTS

| | | |
|---|---|---|
| WO | WO2010/020199 A1 | 2/2010 |
| WO | WO2014/072615 A1 | 5/2014 |
| WO | WO2014/123740 A1 | 8/2014 |
| WO | WO2014/149105 A1 | 9/2014 |

OTHER PUBLICATIONS

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

* cited by examiner

EMBEDDED ELECTRIC MACHINE

CROSS-REFERENCE TO RELATED APPLICATIONS

The present application claims priority to, as a continuation of, U.S. patent application Ser. No. 16/366,453 filed on Mar. 27, 2019, which in turn is a continuation application of U.S. patent application Ser. No. 15/242,789 filed on Aug. 22, 2016, the contents of which are incorporated by reference herein in their entirety.

FIELD OF THE INVENTION

The present subject matter relates generally to a gas turbine engine having an embedded electric machine, and to a propulsion system for an aeronautical device including the same.

BACKGROUND OF THE INVENTION

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft, it may be beneficial for the propulsion system to include an electric fan to supplement propulsive power provided by the one or more gas turbine engines included with the propulsion system. However, providing the aircraft with a sufficient amount of energy storage devices to power the electric fan may be space and weight prohibitive. Notably, certain gas turbine engines may include auxiliary generators positioned, e.g., within a cowling of the gas turbine engine. However, these auxiliary generators are not configured to provide a sufficient amount of electrical power to adequately drive the electric fan.

Accordingly, a propulsion system for an aircraft having one or more gas turbine engines and electric generators capable of providing an electric fan, or other electric propulsor, with a desired amount of electrical power would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines a radial direction and an axial direction. The gas turbine engine includes a compressor section and a turbine section arranged in serial flow order, the compressor section and turbine section together defining a core air flowpath. The gas turbine engine also includes a rotary component rotatable with at least a portion of the compressor section and with at least a portion of the turbine section. The gas turbine engine also includes an electric machine coupled to the rotary component at least partially inward of the core air flowpath along the radial direction. The gas turbine engine also includes a cavity wall defining at least in part a buffer cavity, the buffer cavity surrounding at least a portion of the electric machine to thermally insulate the electric machine.

In another exemplary embodiment of the present disclosure, a propulsion system is provided for an aeronautical device. The propulsion system includes an electric propulsor and a gas turbine engine defining a radial direction and an axial direction. The gas turbine engine includes a compressor section and a turbine section arranged in serial flow order, the compressor section and turbine section together defining a core air flowpath. The gas turbine engine also includes a rotary component rotatable with at least a portion of the compressor section and with at least a portion of the turbine section. The gas turbine engine also includes an electric machine coupled to the rotary component at least partially inward of the core air flowpath along the radial direction, the electric machine electrically connected to the electric propulsor. The gas turbine engine also includes a cavity wall defining at least in part a buffer cavity, the buffer cavity surrounding at least a portion of the electric machine to thermally insulate the electric machine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
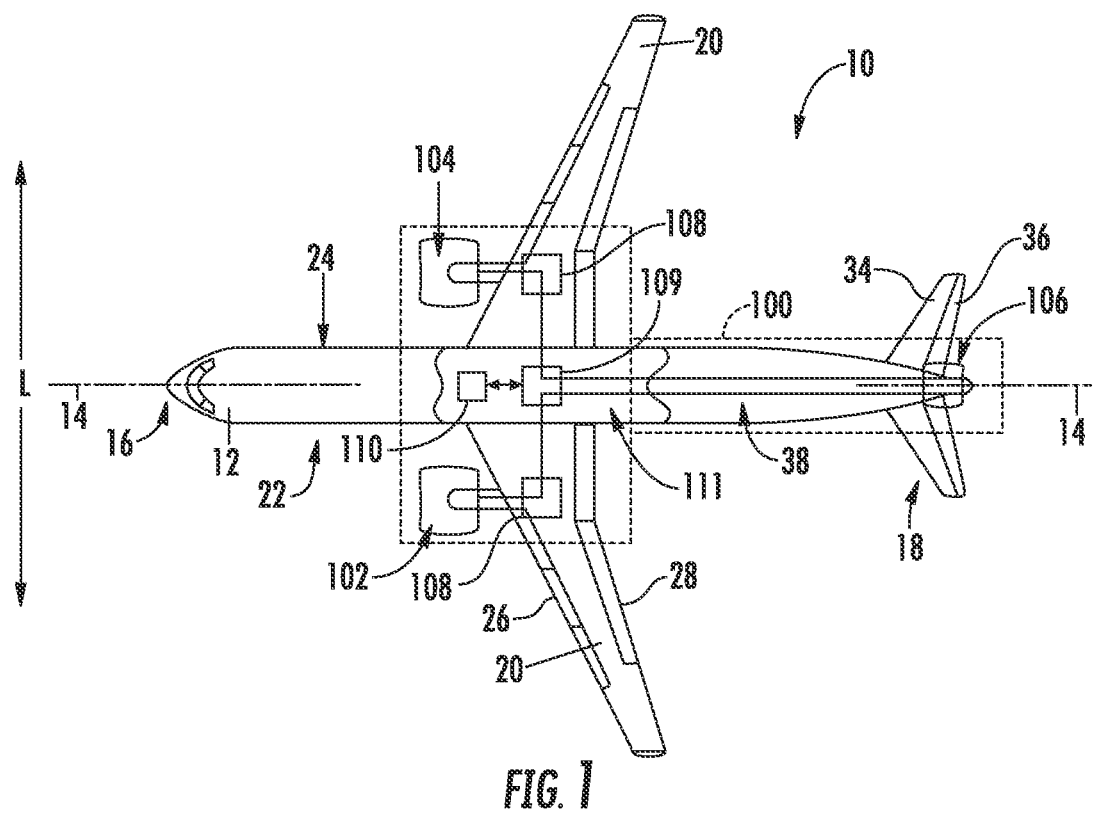
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present application is directed generally towards a gas turbine engine of a propulsion system for an aircraft having an electric machine embedded therein. In at least certain embodiments, the gas turbine engine includes a compressor section and a turbine section arranged in serial flow order and together defining a core air flowpath. A rotary component, such as a shaft or spool, is rotatable with at least a portion of the compressor section and the turbine section. The gas turbine engine additionally includes an electric machine embedded within the gas turbine engine. For example, the electric machine is rotatable with the rotary component and is positioned coaxially with the rotary component at least partially inward of the core air flowpath along a radial direction of the gas turbine engine. For example, in at least certain embodiments, the electric machine may be an electric generator, driven by the rotary component. Additionally, the gas turbine engine includes a cavity wall defining at least in part a buffer cavity. The buffer cavity surrounds at least a portion of the electric machine to thermally insulate the electric machine from, e.g., relatively high temperatures within the core air flowpath of the gas turbine engine.

Figure 2:
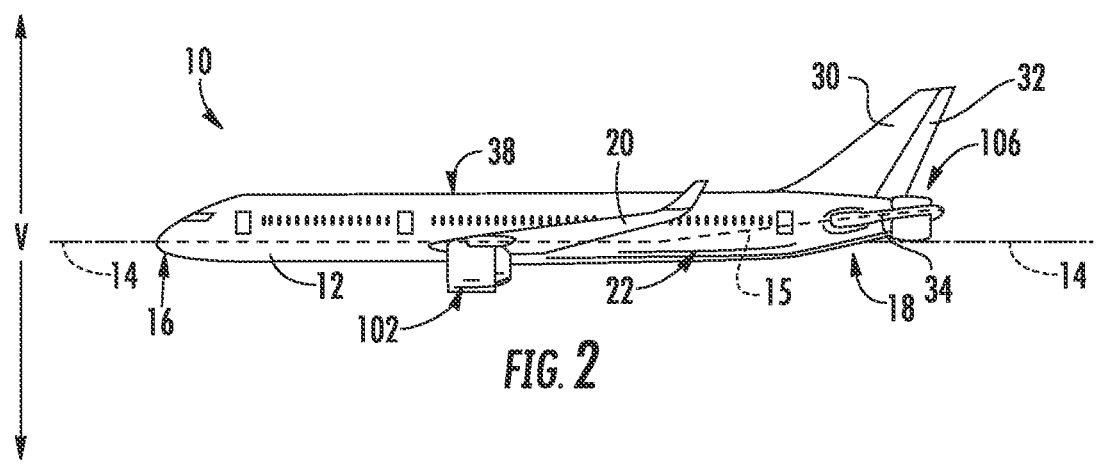
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to the BLI fan 106.

Figure 3:
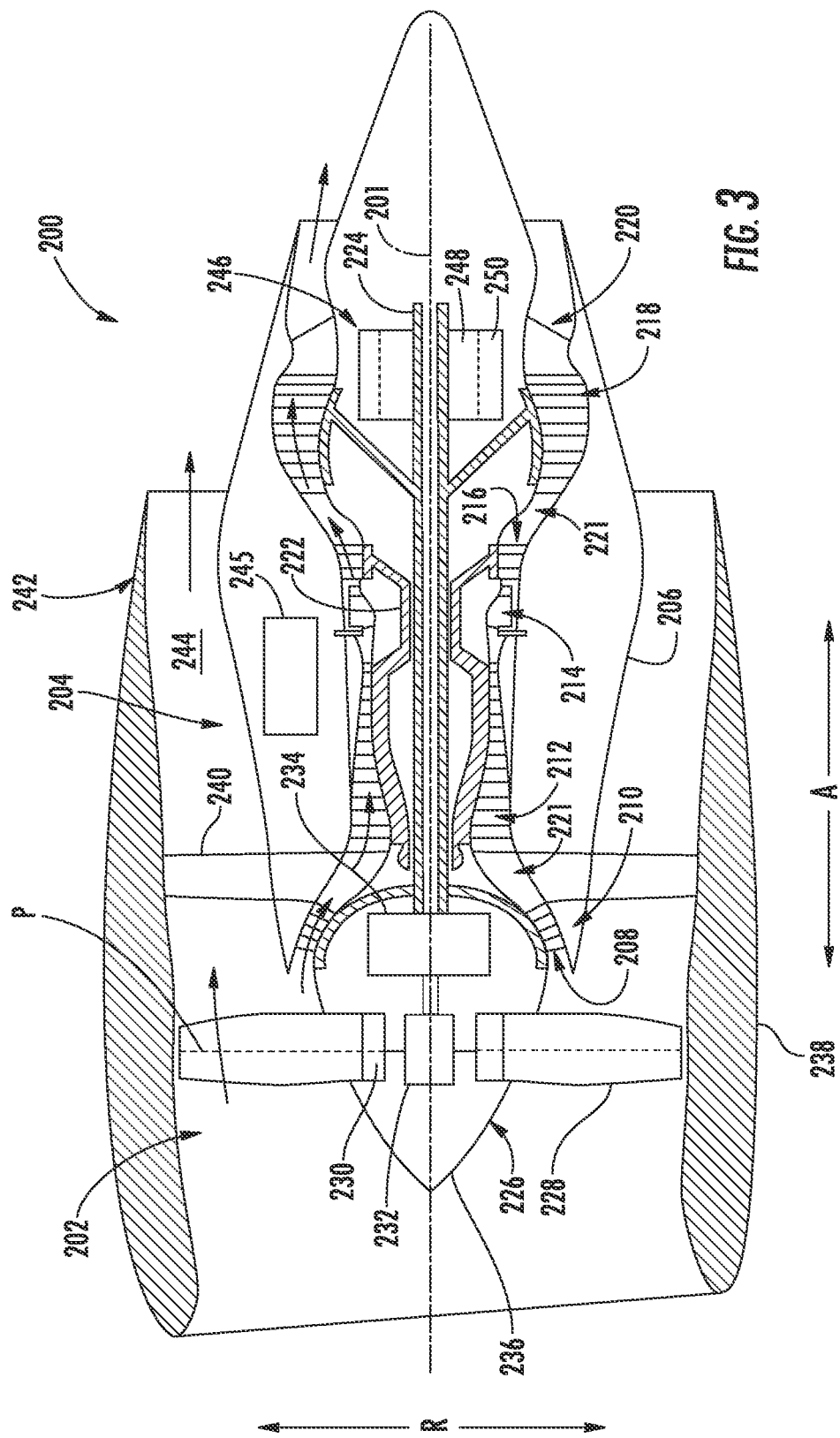
FIG. 3 is a schematic, cross-sectional view of a gas turbine engine in accordance with an exemplary aspect of the present disclosure.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A (extending parallel to a longitudinal centerline 201 provided for reference), a radial direction R, and a circumferential direction C (extending about the axial direction A; not depicted in FIG. 3). In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. The nacelle 238 is supported relative to the core turbine engine 204 by a plurality of circumferentially-spaced outlet guide vanes 240. A downstream section 242 of the nacelle 238 extends over an outer portion of the core turbine engine 204 so as to define a bypass airflow passage 244 therebetween.

Although not depicted, the variety of rotatory components of the turbofan engine 10 (e.g., LP shaft 224, HP shaft 222, fan 202) may be supported by one or more oil lubricated bearings. The turbofan engine 10 depicted includes a lubrication system 245 for providing one or more of the oil lubricated bearings with lubrication oil. Further, the lubrication system 245 may include one or more heat exchangers for transferring heat from the lubrication oil with, e.g., bypass air, bleed air, or fuel.

Additionally, the exemplary turbofan 200 depicted includes an electric machine 246 rotatable with the fan 226. Specifically, for the embodiment depicted, the electric machine 246 is configured as an electric generator co-axially mounted to and rotatable with the LP shaft 224 (the LP shaft 224 also rotating the fan 226 through, for the embodiment depicted, the power gearbox 234). As used herein, "co-axially" refers to the axes being aligned. It should be appreciated, however, that in other embodiments, an axis of the electric machine 246 may be offset radially from the axis of the LP shaft 224 and further may be oblique to the axis of the LP shaft 224, such that the electric machine 246 may be positioned at any suitable location at least partially inward of the core air flowpath 221.

The electric machine 246 includes a rotor 248 and a stator 250. In certain exemplary embodiments, the rotor 248 and stator 250 of the electric machine 246 are configured in substantially the same manner as the exemplary rotor and stator of the electric machine described below. Notably, when the turbofan engine 200 is integrated into the propulsion system 100 described above with reference to FIGS. 1 and 2, the electric generators 108 may be configured in substantially the same manner as the electric machine 246 of FIG. 3.

It should be also appreciated, however, that the exemplary turbofan engine 200 depicted in FIG. 3 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine.

Figure 4:
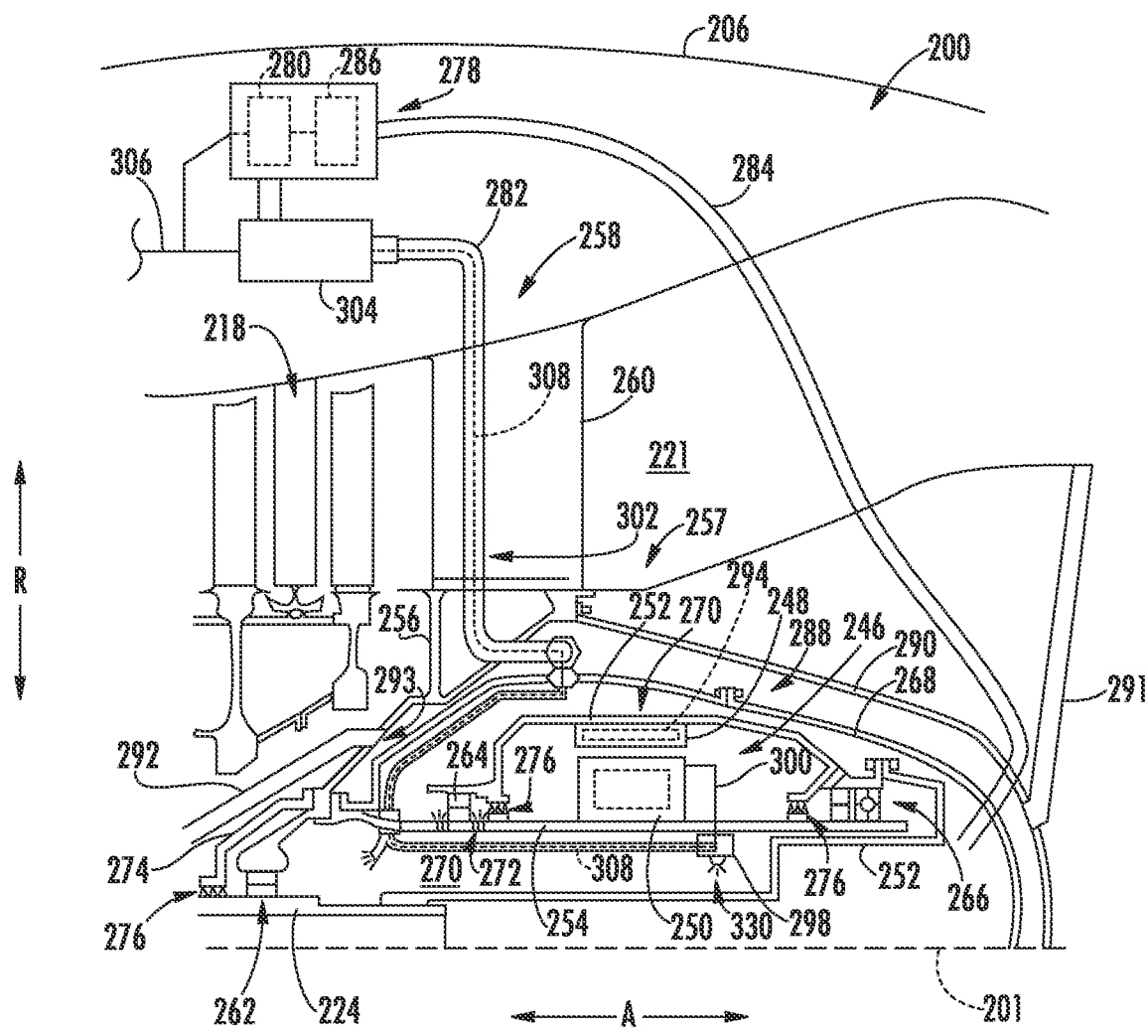
FIG. 4 is a schematic, cross-sectional view of an electric machine embedded in a gas turbine engine in accordance with an exemplary embodiment of the present disclosure.

Referring now to FIG. 4, an electric machine 246 embedded within a gas turbine engine in accordance with an exemplary embodiment of the present disclosure is depicted. More particularly, for the embodiment depicted, the electric machine 246 is embedded within a turbine section of the gas turbine engine, and more particularly still, is attached to an LP shaft 224 of the gas turbine engine. Additionally, the electric machine 246 is positioned at least partially within or aft of the turbine section along an axial direction A. In certain exemplary embodiments, the electric machine 246 and gas turbine engine depicted in FIG. 4 may be configured in substantially the same manner as the exemplary electric machine 246 and turbofan engine 200 described above with reference to FIG. 3. Accordingly, the same or similar numbers may refer to the same or similar parts.

As is depicted, the electric machine 246 generally includes a rotor 248 and a stator 250. The rotor 248 is attached via a plurality of rotor connection members 252 directly to the LP shaft 224, such that the rotor 248 is rotatable with the LP shaft 224. By contrast, the stator 250 is attached via one or more stator connection members 254 to a structural support member 256 of the turbine section. In at least certain exemplary embodiments, the electric machine 246 may be an electric generator, such that the rotor 248, and rotor connection members 252, are driven by the LP shaft 224. With such an embodiment, a rotation of the rotor 248 relative to the stator 250 may generate electrical power, which may be transferred via an electric communication bus 258, discussed in greater detail below.

It should be appreciated, however, that in other exemplary embodiments, the electric machine 246 may instead have any other suitable configuration. For example, in other embodiments the electric machine 246 may include the rotor 248 located radially inward of the stator 250 (e.g., as an in-running electric machine).

Referring still to the exemplary electric machine 246 of FIG. 4, the structural support member 256 may be configured as part of an aft frame assembly 257 and extends from an aft frame strut 258 of the aft frame assembly 257 of the gas turbine engine. The aft strut 258 extends through the core air flowpath 221 of the gas turbine engine, and is configured to provide structural support for the gas turbine engine. The structural support member 256 also extends forward to support an aft engine bearing 262—the aft engine bearing 262 rotatably supporting an aft end of the LP shaft 224.

The stator connection member 254 may be an annular/cylindrical member extending from the structural support member 256 of the gas turbine engine. For the embodiment depicted, the stator connection member 254 supports rotation of the plurality of rotor connection members 252 through one or more bearings. More specifically, a forward electric machine bearing 264 is positioned forward of the electric machine 246 and between the rotor connection member 252 and the stator connection member 254 along a radial direction R. Similarly, an aft electric machine bearing 266 is positioned aft of the electric machine 246 and between the rotor connection member 252 and the stator connection member 254 along the radial direction R. Particularly for the embodiment depicted, the forward electric machine bearing 264 is configured as a roller element bearing and the aft electric machine bearing 266 includes a pair of bearings, the pair of bearings configured as a roller element bearing and a ball bearing. It should be appreciated, however, that the forward and aft electric machine bearings 264, 266 may in other embodiments, have any other suitable configuration and the present disclosure is not intended to be limited to the specific configuration depicted, unless such limitations are added to the claims.

The gas turbine engine further includes a cavity wall 268 surrounding at least a portion of the electric machine 246. More specifically, for the embodiment depicted, the cavity wall 268 substantially completely surrounds electric machine 246, extending from a location forward of the electric machine 246 (attached to the structural support member 256, through the stator connection member 254) to a location aft of the electric machine 246. The cavity wall 268 defines at least in part an electric machine sump 270 substantially completely surrounding the electric machine 246. More specifically, the electric machine sump 270 extends from a location forward of the electric machine 246 continuously to a location aft of the electric machine 246. Certain components of the gas turbine engine include openings 272 to allow for such a continuous extension of the electric machine sump 270.

Notably, for the embodiment depicted, the electric machine sump 270 additionally encloses the aft engine bearing 262 of the gas turbine engine. The gas turbine engine includes a sealing arm 274 attached to the structural support member 256 and extending forward of the aft engine bearing 262 to form a seal with the LP shaft 224 and include the aft engine bearing 262 within the electric machine sump 270. Notably, a seal assembly 276 is provided as part of the sealing arm 274 and/or the LP shaft 224 for providing such a seal and maintaining a sealed electric machine sump 270. As is also depicted, the gas turbine engine further includes a plurality of seal assemblies 276 adjacent to the forward electric machine bearing 264 and the aft electric machine bearings 266, for maintaining a sealed electric machine 246, i.e., preventing lubrication oil from reaching the rotor 248 and stator 250 of the electric machine 246.

Moreover, the gas turbine engine depicted includes an electric machine lubrication system 278, with the electric machine lubrication system 278 in fluid communication with the electric machine sump 270, for providing a thermal fluid to the electric machine sump 270. For the embodiment depicted, the electric machine lubrication system 278 may operate independently of a gas turbine engine lubrication system, such as the lubrication system 245 described above with reference to FIG. 3.

Specifically, for the embodiment depicted, the electric machine lubrication system 278 include a supply pump 280 connected to a supply line 282 extending to the electric machine sump 270. The supply line 282 extends from a location outward of the core air flowpath 221 along the radial direction R, through the aft engine strut 258 (and through the core air flowpath 221), through the cavity wall 268 and to the electric machine sump 270. The thermal fluid may be a lubrication oil or other suitable lubricant for lubricating the forward electric machine bearing 264 and the aft electric machine bearings 266, as well as the aft engine bearing 262. Notably, the thermal fluid is further configured to accept heat from the plurality of bearings and the electric machine sump 270. The heated thermal fluid is scavenged out of the electric machine sump 270 via a scavenge line 284 of the lubrication system 278, the scavenge line 284 extending from the electric machine sump 270, through the core air flowpath 221, and to a scavenge pump 286. It should be appreciated, however, that although the scavenge line 284 is, for the embodiment depicted, extending through the core air flowpath 221 at a location outside of the strut 260, in other embodiments, the scavenge line 284 may instead extend through the strut 260 alongside the supply line 282.

Notably, for the embodiment depicted, the electric machine lubrication system 278, including the supply pump 280 and scavenge pump 286, may be powered at least in part by the electric machine 246. Additionally, although not depicted, the electric machine lubrication system 278 may further include one or more heat exchangers for reducing a temperature of the scavenged thermal fluid, before such thermal fluid is provided back through the supply line 282 to the electric machine sump 270.

Notably, with such an embodiment, the lubrication system 278 may further be configured as part of a cooling system of the gas turbine engine for reducing a temperature of the electric machine 246. For example, the inventors of the present disclosure have discovered that for at least certain embodiments, providing lubrication oil to the lubrication oil supply line 282 at a temperature less than about 275° F., such as less than about 250° F., may allow for the lubrication oil to accept an amount of heat necessary to maintain the electric machine 246 within a desired temperature operating range during operation of the gas turbine engine. It should be appreciated, that as used herein, terms of approximation, such as "about" or "approximately," refer to being within a 10% margin of error. Also, it should be appreciated, that in other embodiments, the lubrication oil provided to the supply line 282 may have any other suitable temperature.

In order to further maintain a temperature of the electric machine 246, the cooling system of exemplary gas turbine engine depicted further includes a buffer cavity 288 surrounding at least a portion of the electric machine 246 to thermally insulate the electric machine 246. More specifically, for the embodiment depicted, the cavity wall 268 also at least partially defines the buffer cavity 288 with the buffer cavity 288 being positioned opposite the cavity wall 268 of the electric machine sump 270. Additionally, as depicted in FIG. 4, an extension member 290 is attached to or formed integrally with the structural support member 256 and extends at least partially around the cavity wall 268. Specifically, for the embodiment depicted, the structural support member 256 and extension member 290 together extend completely around the cavity wall 268. The structural support member 256 and extension member 290 together define the buffer cavity 288, which for the embodiment depicted extends continuously from a location forward of the electric machine 246 to a location aft of the electric machine 246 along the axial direction A. The buffer cavity 288 may act as an insulator from relatively hot operating temperatures within the core air flowpath 221 extending through the turbine section of the gas turbine engine.

Furthermore, for the embodiment depicted, the gas turbine engine further includes a cooling duct 292. The cooling duct 292 is in airflow communication with the buffer cavity 288 for providing a cooling airflow to the buffer cavity 288. For example, in the embodiment depicted, the cooling duct 292 defines an outlet 293 extending through the structural support member 256 for providing the cooling airflow from the cooling duct 292 through the structural support member 256 and into the buffer cavity 288. The cooling duct 292 may also be in airflow communication with a relatively cool air source for providing the cooling airflow. In certain exemplary embodiments, the cool air source may be a compressor section of the gas turbine engine (wherein the cooling airflow may be diverted from the compressor section), or a fan of the gas turbine engine (wherein the cooling airflow may be diverted from the fan). Notably, for the embodiment depicted, the gas turbine engine further includes an exhaust duct 291. The exhaust duct 291 is in airflow communication with the buffer cavity 288 and is configured to exhaust the cooling airflow to the core air flowpath 221, a bypass passage (e.g., passage 244 of FIG. 3), or an ambient location. Such a configuration may allow for a continuous cooling airflow through the buffer cavity 288.

As discussed, the electric machine lubrication system 278, cooling duct 292, and buffer cavity 288 are each configured as part of the cooling system for maintaining at least certain components of the electric machine 246 within a desired temperature range. For example, for the embodiments wherein the electric machine 246 is configured as an electric generator, the electric generator may be configured as a permanent magnet electric generator including a plurality of permanent magnets 294 (depicted in phantom). For these embodiments, the rotor 248 may include the plurality of permanent magnets 294 and the stator 250 may include one or more coils of electrically conductive wire (not shown). It should be appreciated, however, that in other embodiments, the electric machine 246 may alternatively be configured as an electromagnetic generator, including a plurality of electromagnets and active circuitry, as an induction type electric machine, a switched reluctance type electric machine, as a synchronous AC electric machine, or as any other suitable electric generator or motor.

As will be appreciated, each of the plurality of permanent magnets 294, when included, defines a Curie temperature limit, which may be less than a temperature within the core air flowpath 221 extending through the turbine section of the gas turbine engine. The cooling system of the gas turbine engine maintains a temperature of the electric machine 246, and more particularly each of the permanent magnets 294, below the Curie temperature limit for the plurality of permanent magnets 294. Further, the cooling system may maintain a temperature of the electric machine 246 below a predetermined limit of the Curie temperature limit to, e.g., increase a useful life of the electric machine 246. For example, in certain exemplary embodiments, the cooling system the gas turbine engine may maintain a temperature of the electric machine 246 below at least about a 50 degrees Fahrenheit (° F.) limit of the Curie temperature limit, such as below at least about a 75° F. limit or 100° F. limit of the Curie temperature limit. Maintaining a temperature of the electric machine 246 below such a limit of the Curie temperature limit may further prevent any permanent magnets of the electric machine 246 from experiencing unrecoverable (or permanent) de-magnetization, which may have a negative life impact on the electric machine 246.

Figure 5:
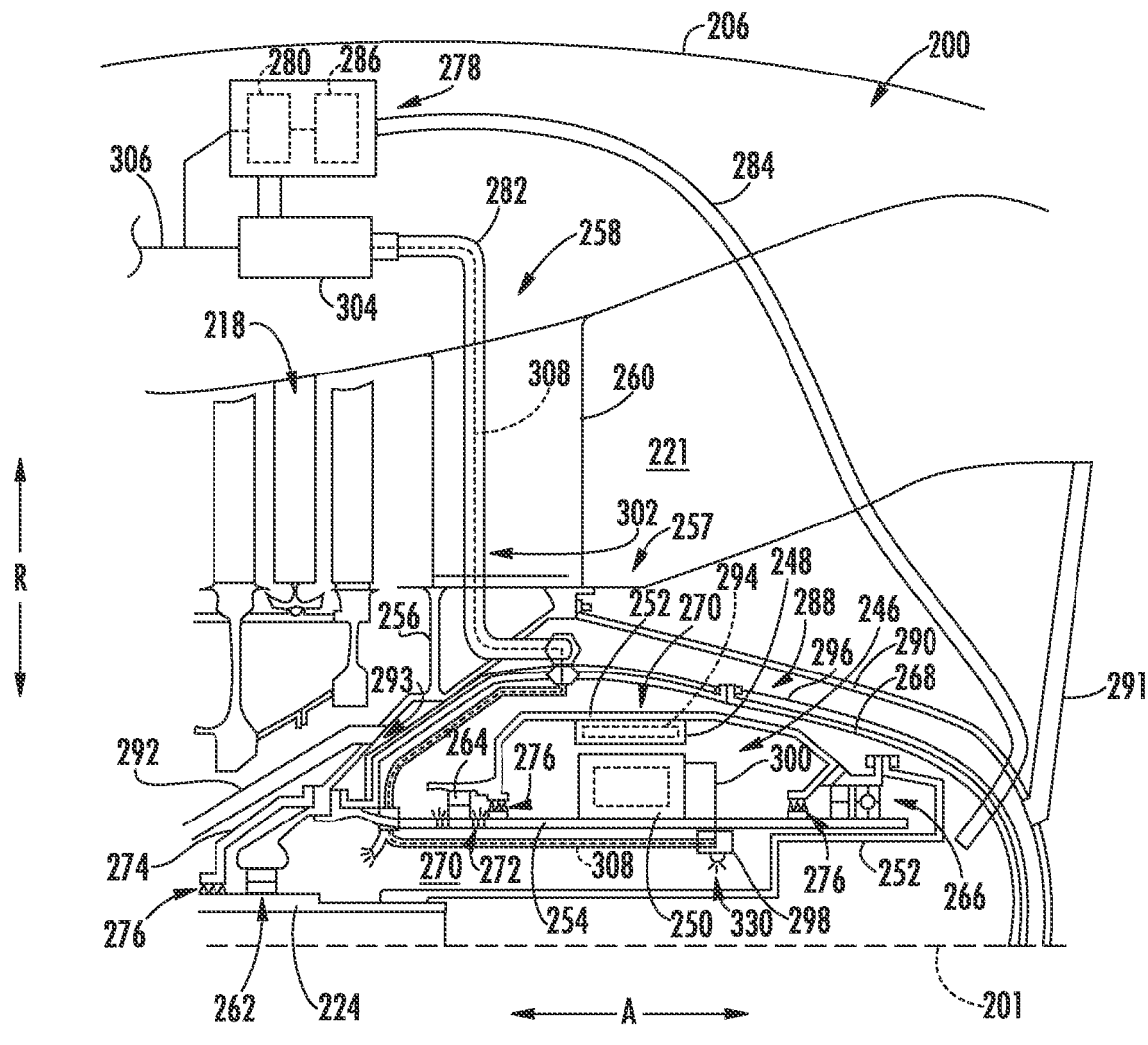
FIG. 5 is a schematic, cross-sectional view of an electric machine embedded in a gas turbine engine in accordance with another exemplary embodiment of the present disclosure.

It should be appreciated, however, that the exemplary cooling system depicted in the embodiment of FIG. 4 is provided by way of example only. In other embodiments, the gas turbine engine may include any other suitable cooling system. For example, in other embodiments, the electric machine lubrication system 278 may have any other suitable configuration. For example, the electric machine lubrication system 278 may be operable with the engine lubrication system 278. Additionally, in certain embodiments, the cavity wall 268 may have any other suitable features for maintaining a temperature of the electric machine 246 within a desired operating range. For example, referring now briefly to FIG. 5, a cross-sectional, schematic view of an electric machine 246 embedded within a gas turbine engine in accordance with another exemplary embodiment of the present disclosure is depicted. The exemplary gas turbine engine depicted in FIG. 5 may be configured in substantially the same manner as the exemplary gas turbine engine depicted in FIG. 4, and accordingly the same or similar numbers may refer to same or similar part. However, for the embodiment of FIG. 5, the cavity wall 268, which at least partially defines a buffer cavity 288, further includes a layer 296 of insulation to further insulate the electric machine 246 from relatively hot operating temperatures within the core air flowpath 221 extending through the turbine section of the gas turbine engine. The insulation layer 296 may be any suitable insulation for reducing a thermal conductivity of the cavity wall 268 surrounding the electric machine 246. Additionally, although not depicted, in certain embodiments, a portion of the structural support member 256 and extension member 290 (also at least partially defining the buffer cavity 288) may also include a layer of insulation.

Referring again to the embodiment of FIG. 4, as briefly discussed above during operation of the gas turbine engine, the LP shaft 224 may rotate the rotor 248 of the electric machine 246, allowing electric machine 246 to function as an electric generator producing electrical power. Additionally, the electric machine 246 is in electrical communication with—i.e. electrically connected to—the electric communication bus 258. The electric communication bus 258 is electrically connected to the electric machine 246 at a location radially inward of the core air flowpath 221. The electric communication bus 258 includes a first juncture box 298 mounted to the stator connection member 254. The first juncture box 298 receives an electrical line 300 from the electric machine 246 (for the embodiment depicted, from the stator 250 of the electric machine 246) and connects the electric line 300 to an intermediate section 302 of the electric communication bus 258. The intermediate section 302 extends through the core air flowpath 221 to a second juncture box 304 mounted at a location radially outward of the core air flowpath 221, within a cowling of the gas turbine engine. The second juncture box 304 connects the intermediate section 302 of the electric communication bus 258 to an outlet line 306 of the electric communication bus 258 for connection to one or more systems of the gas turbine engine and/or aircraft with which the gas turbine engine is installed. As briefly mentioned above, the electric machine lubrication system 278 may be electrically connected to the outlet line 306 of the electric communication bus 258 for powering the electric machine lubrication system 278.

As stated and depicted in FIG. 4, at least a portion of the electric communication bus 258 extends through the core air flowpath 221. More specifically, for the embodiment depicted, the intermediate section 302 of the electric communication bus 258 extends through the core air flowpath 221 at a location downstream of a combustion section of the gas turbine engine (such as the combustion section 214 of the exemplary turbofan engine 200 of FIG. 3). In particular, the intermediate section 302 extends through/is positioned within the aft strut 258—the aft strut 258 located in a portion of the core air flowpath 221 immediately downstream of the HP turbine 216.

Figure 6:
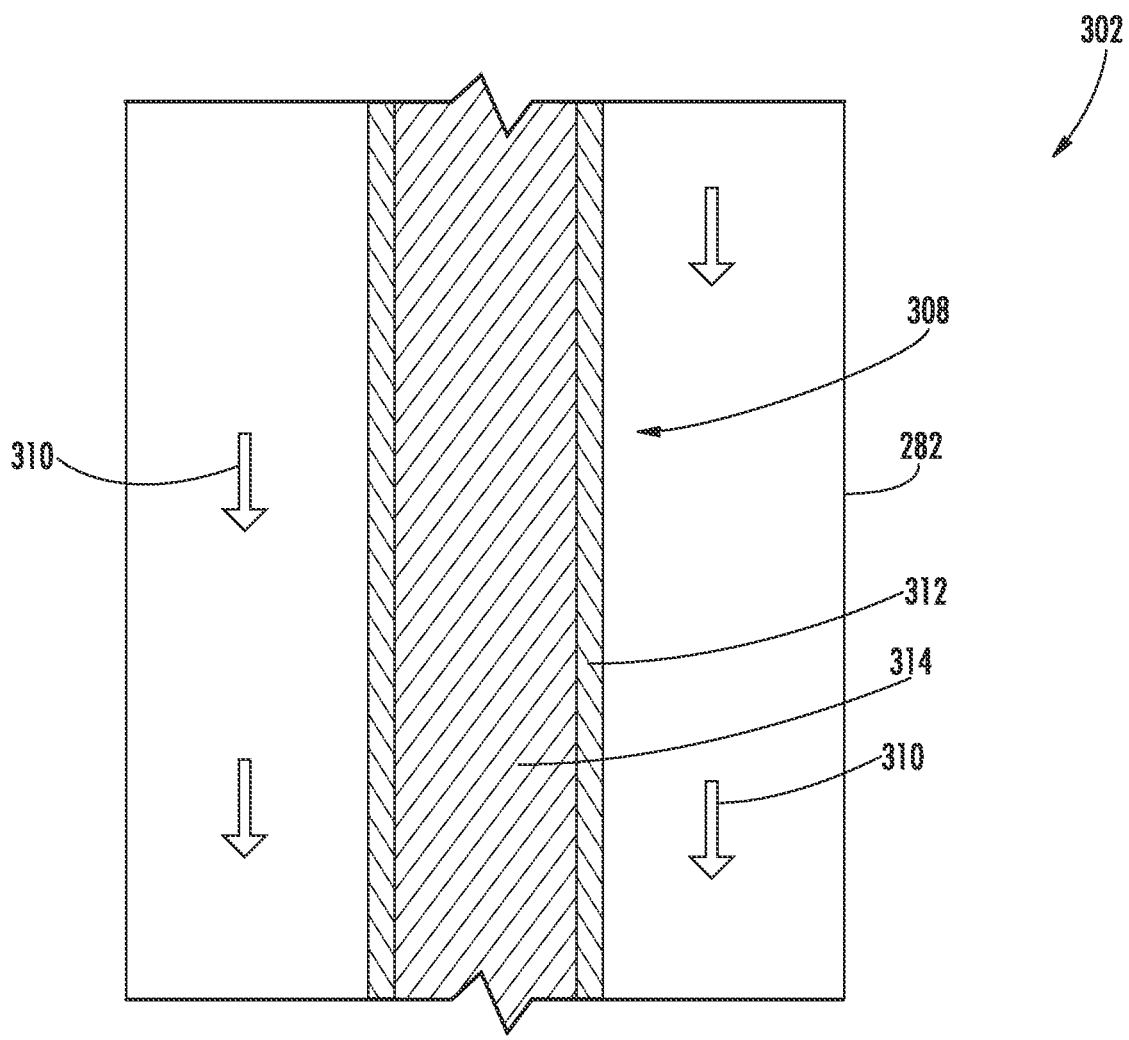
FIG. 6 is a close-up, cross-sectional view of an electric cable positioned within a cooling conduit in accordance with an exemplary embodiment of the present disclosure.

Moreover, as is depicted schematically, the exemplary intermediate section 302 depicted is a cooled portion of the electric communication bus 258, including an electric cable 308 (i.e., an electric conductor) positioned within/extending through a conduit containing a cooling fluid. Specifically, reference will now also be made to FIG. 6, providing a close-up view of a portion of the intermediate section 302 that is configured to extend through the core air flowpath 221 of the gas turbine engine. As is depicted, the intermediate section 302 of the electric communication bus 258 includes the electric cable 308 positioned within and extending coaxially with the supply line 282, such that during operation, the electric cable 308 is surrounded by relatively cool flow of thermal fluid (represented by arrows 310) to be provided, e.g., to the electric machine sump 270. Accordingly, the supply line 282 is considered for the embodiment depicted as part of the electric machine lubrication system 278 as well as part of the intermediate section 302 of the electric communication bus 258. During operation, the thermal fluid surrounding the electric cable 308 within the intermediate section 302 of the electric communication bus 258 may protect the electric cable 308 from relatively high temperatures within the core air flowpath 221, maintaining a temperature of the electric cable 308 within a desired operating range. It should be appreciated, however, that in other embodiments, the intermediate section 302 of the electric communication bus 258 may instead include the electric cable 308 positioned within and extending coaxially with the scavenge line 284 (which may also extend through the strut 260 in certain embodiments).

Notably, the electric cable 308 may be any suitable cable 308, and for the embodiment depicted includes an electrical insulation layer 312 surrounding a conducting core portion 314. The electrical insulation layer 312 may include any suitable electrical insulation capable of being exposed to the relatively high temperatures and further capable of insulating relatively high amounts of electrical power which may be transported through the conducting core portion 314 of the electric cable 308 (see discussion below). Additionally, although not depicted, the electric cable 308 may additionally include a barrier layer surrounding the electric insulation layer 312 and conducting core portion 314 to prevent lubrication oil from contacting the insulation layer 312 and conducting core portion 314. Additionally, still, in certain embodiments, the electric cable 308 may be configured in substantially the same manner as the electric cable 308 described below with reference to FIG. 9.

As will be discussed in greater detail below, the intermediate section 302 of the electric communication bus 258 is configured to transfer relatively high power levels of electrical power. Accordingly, during operation, the intermediate section 302 of the electric communication bus 258 may experience a relatively high amount of Joule heating, or resistive heating, as a result of the relatively high power levels being transferred. Positioning the electric cable 308 of the intermediate section 302 coaxially with the lubrication oil supply line 282 may assist with maintaining a temperature of the electric cable 308 within a desired operating temperature range, despite the resistive heating experienced and exposure to the core air flowpath 221.

It should be appreciated, however, that in other exemplary embodiments, the electric communication bus 258 may have any other suitable configuration for transferring electrical power from the electric machine 246 located radially inward from the core air flowpath 221 to a location radially outward of the core air flowpath 221. For example, referring now briefly to FIG. 7, a cross-sectional, schematic view of an electric machine 246 embedded within a gas turbine engine in accordance with yet another exemplary embodiment of the present disclosure is depicted. The exemplary gas turbine engine depicted in FIG. 7 may be configured in substantially the same manner as exemplary gas turbine engine depicted in FIG. 4, and accordingly the same or similar numbers may refer to same or similar part.

Figure 7:
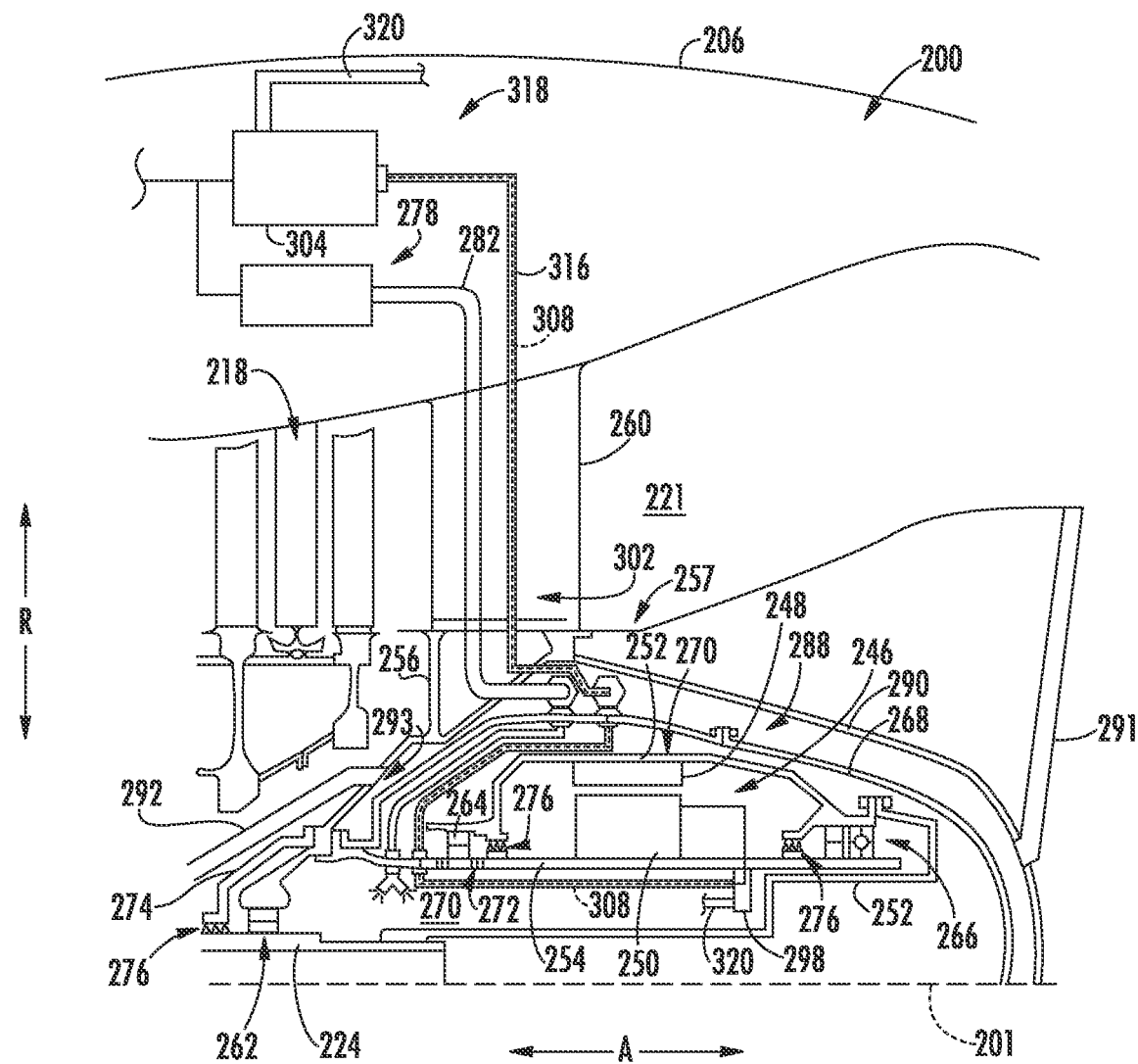
FIG. 7 is a schematic, cross-sectional view of an electric machine embedded in a gas turbine engine in accordance with yet another exemplary embodiment of the present disclosure.

However, for the embodiment of FIG. 7, the electric communication bus 258 is instead configured as a superconducting, or hyper conducting, electric communication bus 258. Accordingly, for the embodiment of FIG. 7, the intermediate section 302 of the electric communication bus 258 may not be configured with the supply line 282 of the electric machine lubrication system 278. Instead, the exemplary electric communication bus 258 includes a separate cooled conduit 316 within which the electric cable 308 is positioned and extends. The electric communication bus 258 includes a refrigerant system 318 for providing a cold refrigerant within the cooled conduit 316 to maintain a temperature of the electric cable 308 extending therethrough at a relatively low temperature. For example, in certain embodiments, the refrigerant system may maintain a temperature of the electric cable 308 at or below a critical temperature of the material forming the electric cable 308, or at least 1° F. cooler than the critical temperature of the material forming the electric cable 308.

Additionally, the cold refrigerant extends to a first juncture box 298, where the refrigerant is separated from the electric line in returned through a return line 320 (partially depicted). For the embodiment depicted, the electric communication bus 258 may additionally include components for operating the refrigeration system 318 in a refrigeration cycle, such as a pump, a condenser, and an expansion valve (not depicted). Notably, in at least certain embodiments, the portion of the intermediate section 302 extending through the core air flowpath 221 may act as an evaporator of the refrigerant cycle.

Although for the embodiment depicted the gas turbine engine includes a separate electric machine lubrication system 278 and refrigerant system 318, in other embodiments the refrigerant utilized by the refrigerant system 318 of the electric communication bus 258 may additionally act as a lubricant for the various bearings within the electric machine 246 (and for the embodiment depicted, for the aft engine bearing 262), such that the refrigerant system 318 and electric machine lubrication system 278 may be configured together as a single system.

Figure 8:
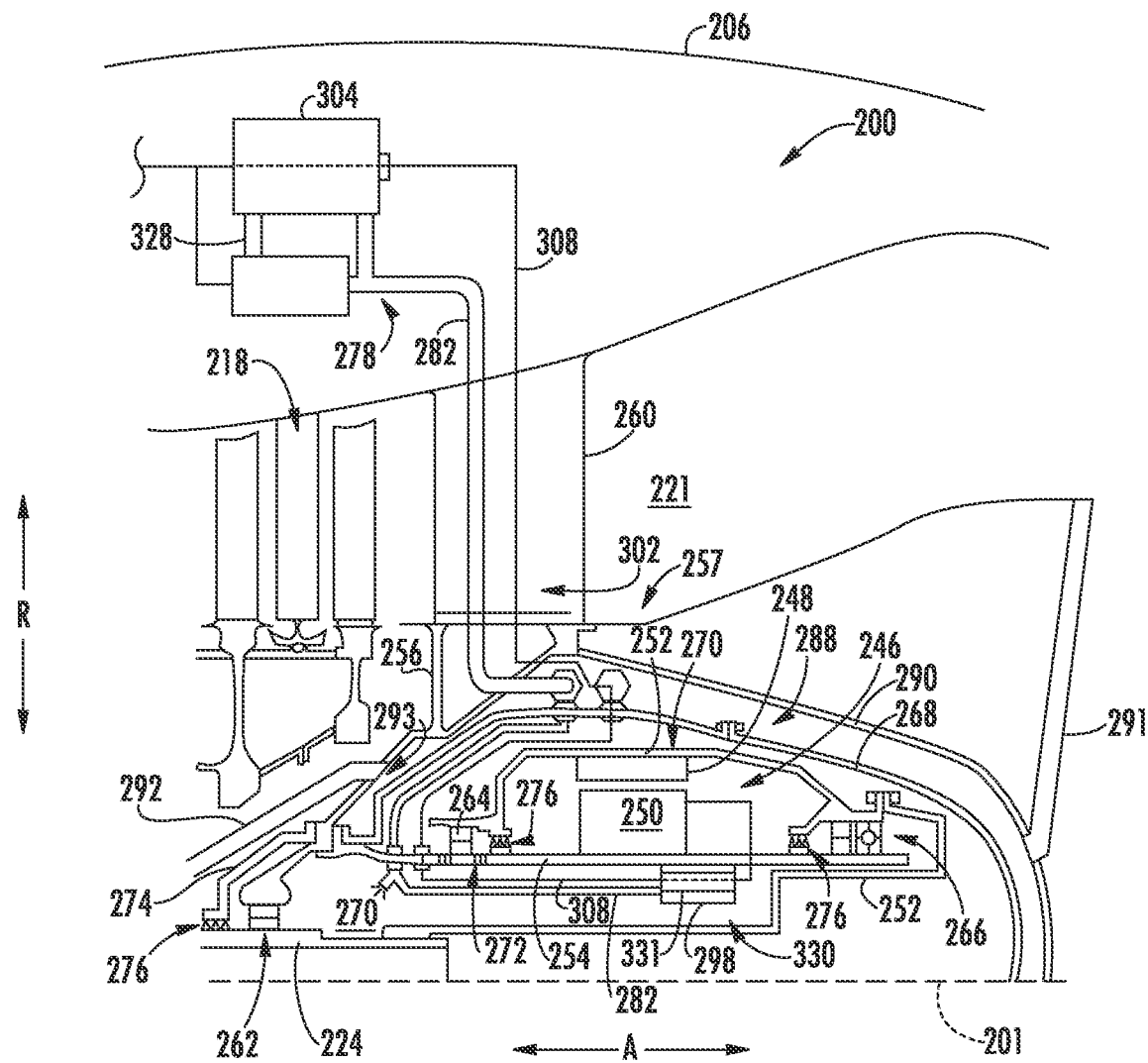
FIG. 8 is a schematic, cross-sectional view of an electric machine embedded in a gas turbine engine in accordance with still another exemplary embodiment of the present disclosure.

Referring now to FIG. 8, a cross-sectional, schematic view of an electric machine 246 embedded within a gas turbine engine in accordance with still another exemplary embodiment of the present disclosure is depicted. The exemplary gas turbine engine depicted in FIG. 8 may be configured in substantially the same manner as exemplary gas turbine engine depicted in FIG. 4, and accordingly the same or similar numbers may refer to same or similar part. However, for the embodiment of FIG. 8, an intermediate section 302 of an electric communication bus 258 is not configured coaxially with a cooling fluid conduit (e.g., a supply line 282). Instead, for the embodiment of FIG. 8, the intermediate section 302 of the electric communication bus 258 is formed of an electric cable 308 designed to withstand the relatively high temperatures of a core air flowpath 221 of the gas turbine engine at a location downstream of a combustion section of the gas turbine engine.

Figure 9:
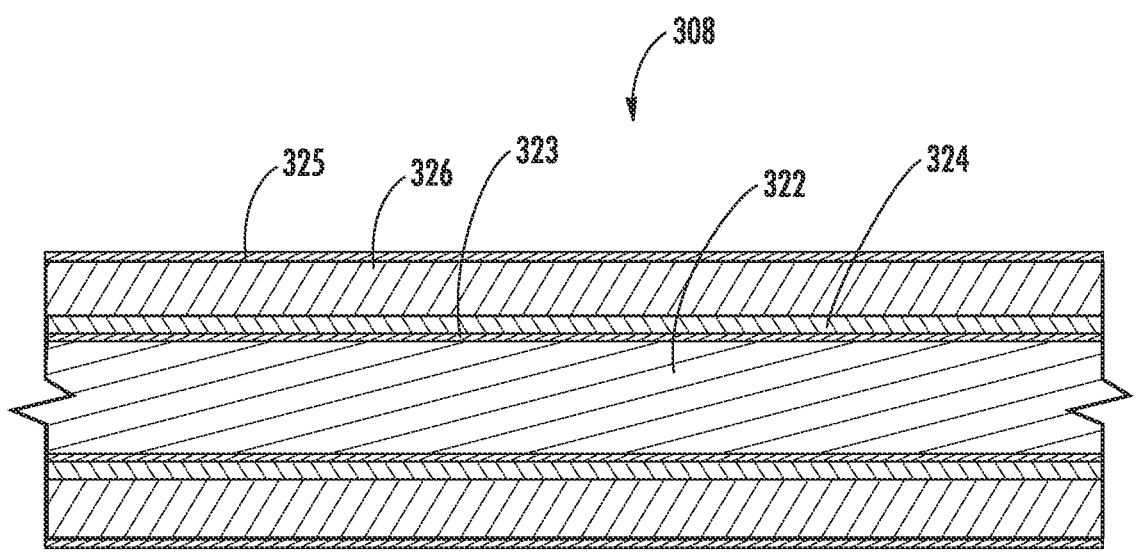
FIG. 9 is a close-up, cross-sectional view of an electric cable in accordance with an exemplary embodiment of the present disclosure.

More specifically, as with the embodiments described above, the electric communication bus 258 includes a first juncture box 298, a second juncture box 304, and the electric cable 308 extending therebetween (i.e., the intermediate section 302). Although the electric cable 308 is depicted as a single cable, in certain embodiments, the electric cable may include a plurality of electric cables. Referring now also briefly to FIG. 9, providing a close-up, schematic view of the electric cable 308, the electric cable 308 is formed of a material capable of transmitting relatively high amounts of electrical power and being exposed to the relatively high temperatures within the core air flowpath 221 without oxidizing.

For example, in certain embodiments, the electric cable 308 may consist of at least one solid nickel wire core. Or, as in the embodiment depicted, the cable 308 may consist of at least one high conductivity core volume, such as a low resistivity/high conductivity cable core 322, and at least one dielectric (electrically-insulating) barrier volume, such as a high resistivity cable jacket 324. The cable core 322 is positioned within the cable jacket 324, such that the cable jacket 324 encloses the cable core 322. In certain exemplary embodiments, the cable core 322 may be a copper core volume and the cable jacket 324 may be a non-copper jacket volume. The cable jacket 324 may be established by one or more encasement processes, such as dipping, co-extrusion, plating, spraying, cladding, swaging, roll-forming, welding, or a combination thereof. The electric cable 308 depicted additionally includes an oxidation barrier volume 323 positioned between the cable core 322 and cable jacket 324. Notably, the cable 308 may be configured as a wire braid, a transposed and compacted wire bundle, transposed bundle(s) of transposed wire bundle(s), or any other suitable cable configuration for transferring alternating current ("AC") power in a manner to reduce AC coupling losses.

Additionally, for the embodiment depicted, the cable core 322 and cable jacket 324 of the electric cable 308 are covered and enclosed within a high temperature electric insulation material 326. For example, in certain embodiments, the high temperature electric insulation material 326 may be a sprayed lamellar barrier coating (ceramic), at least one fractionally-overlapped tape layer (mica, glass fiber, ceramic fiber, and/or polymeric film), external armor barrier (braided, metallic and/or non-metallic), or combinations thereof. The high temperature electric insulation material 326 may be suitable for insulating cables transferring relatively high amounts of electrical power at relatively high temperatures, as discussed below. Further, for the embodiment depicted, the electric cable 308 includes at least one external armor volume 325 as an anti-abrasion barrier, which in certain embodiments may be the same as the insulation material 326.

As is also depicted, the electric machine lubrication system 278 (configured as part of the overall electric machine cooling system) is configured to provide thermal fluid directly to the second juncture box 304 through a connection line 328 for actively cooling the second juncture box 304. Additionally, the thermal fluid supply line 282 of the electric machine lubrication system 278 extends to the first juncture box 298 and provides a flow of thermal fluid directly to the first juncture box 298 for actively cooling the first juncture box 298. Notably, for the embodiment depicted, the first juncture box 298 includes a thermal fluid outlet 330 for ejecting the flow of thermal fluid provided thereto to the electric machine sump 270.

By actively cooling the first juncture box 298 and the second juncture box 304, the intermediate section 302 including the electric cable 308 may be allowed to operate at relatively high temperatures, such as temperatures resulting from exposure to the core air flowpath 221, as well as from Joule heating, or electric resistance heating, of the electric cable 308 during operation of the electric machine 246. A temperature of the electric cable 308 with such a configuration may be reduced at the first juncture box 298 and at the second juncture box 304, allowing for the electric cable 308 to be electrically connected to other electrical lines (e.g., outlet line 306 and electric line 300), which may not be configured for operating at the relatively high temperatures at which the electric cable 308 of the intermediate section 302 is capable of operating.

Moreover, as is also depicted, schematically, further beneficial cooling may be achieved by equipping the second juncture box 304 with an embedded auxiliary fluid flow circuit 331 in heat transfer communication with the fluid transiting connection line 328. The auxiliary fluid within the auxiliary fluid flow circuit 331 may be the same fluid supplied by the fluid supply line 282, or alternatively, may be a distinct thermal transfer fluid. Further, although not depicted, the auxiliary fluid may itself be in subsequent heat transfer communication with a heat-sinking media such as aircraft engine fuel, propulsor fan air, or a motor electronics coolant.

During operation of a gas turbine engine including an electric machine 246 in accordance with an exemplary embodiment of the present disclosure, the electric machine 246 may be configured to generate a relatively high amount of alternating current electric power. For example, in certain embodiments, the electric machine 246 may be configured to generate and deliver through the electric communication bus 258 electrical power at five hundred (500) Volts ("V") or more. For example, in certain embodiments, the electric machine 246 may be configured to generate and deliver through the electric communication bus 258 electrical power at six hundred (600) V or more. Such a configuration may be enabled by the disclosed cooling systems for maintaining a temperature of the electric machine 246 within a certain operating temperature range, and/or by designing the intermediate section 302 of the electric communication bus 258 in a manner allowing it to be exposed to the relatively high temperatures within the core air flowpath 221 downstream of the combustion section of the gas turbine engine.

Referring again briefly to FIGS. 1 and 2, in certain exemplary embodiments of the present disclosure a propulsion system 100 is provided having a plurality of gas turbine engines and electric machines. For example, the propulsion system 100 may include a first engine 102 and electric machine 108 and a second engine 104 and electric machine 108. Each of the first and second engines 102, 104 and respective electric machines 108 may be configured in substantially the same manner as one or more of the gas turbine engines and embedded electric machines 246 described above with reference to FIGS. 4 through 8. With such an exemplary embodiment, the first engine 102 and electric machine 108 may be configured to generate electrical power at a first voltage level and the second engine 104 and electric machine 108 may be configured to generate electrical power at a second voltage level. The first and second voltage levels generated may be provided through an electric communication bus 111 to an electric propulsion device, such as the exemplary BLI fan 106 depicted. Notably, in at least certain embodiments, the electric propulsion device may require (or desire) electrical power at a voltage level greater than each of the first and second engines 102, 104 and respective electric machines 108 may safely generate individually. Accordingly, in certain exemplary aspects, the first voltage level with respect to a ground plane of the aircraft 10 may be a positive voltage level and the second voltage level may be at a negative voltage level with respect to the ground plane of the aircraft 10. Further, in at least certain embodiments, the first voltage level may have substantially the same absolute value as an absolute value of the second voltage level. With such a configuration, the pair of first and second engines 102, 104 and respective electric machines 108 may therefore be capable of providing a net differential voltage to electrical terminations of the electric propulsion device approximately twice as great as a single engine and electric machine may otherwise be capable of, therefore providing the electric propulsion device a desired amount of electrical power.

Figure 10:
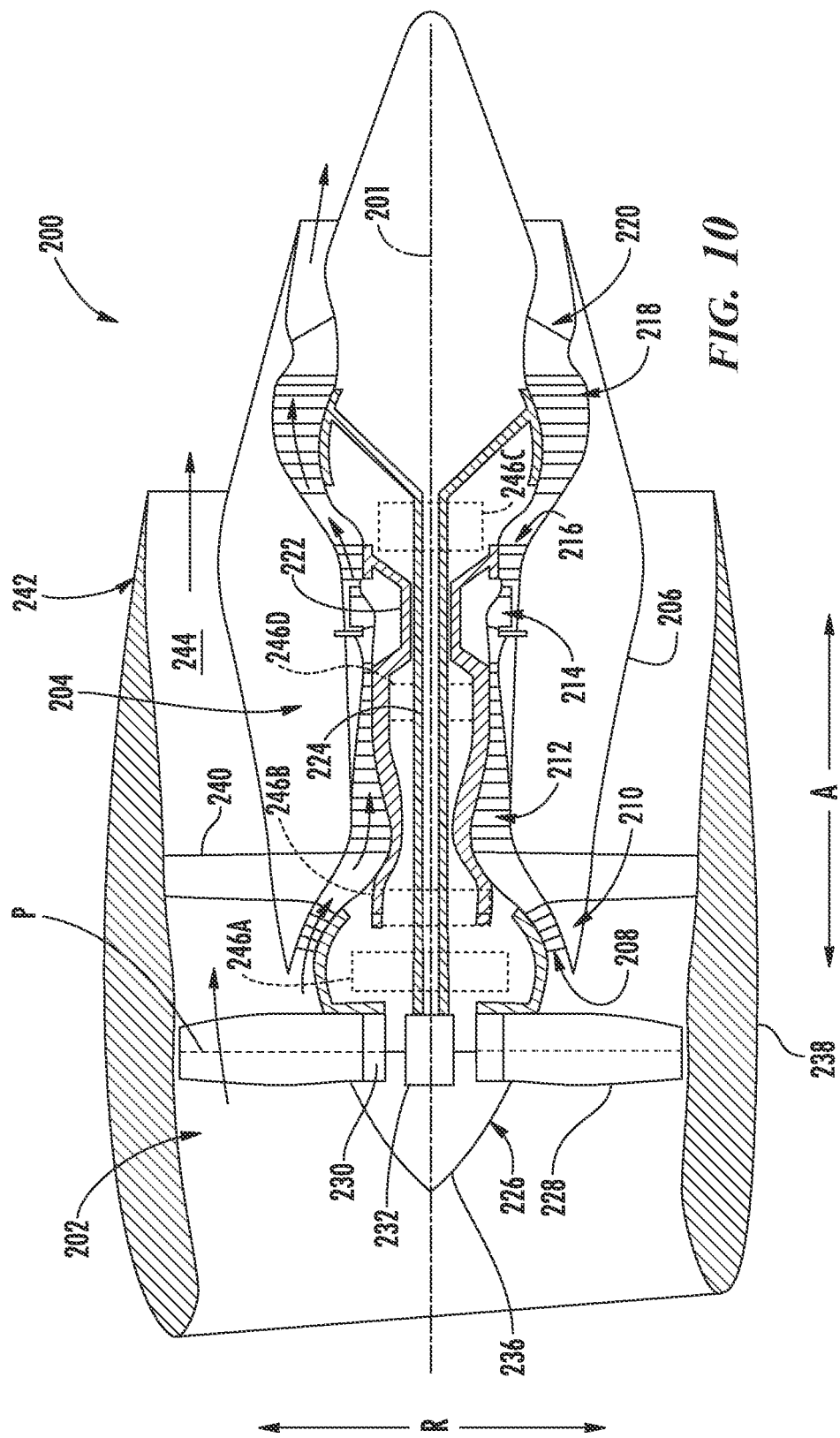
FIG. 10 is a schematic, cross-sectional view of a gas turbine engine in accordance with another exemplary embodiment of the present disclosure.

Moreover, referring now to FIG. 10, a schematic, cross-sectional view is provided of a gas turbine engine in accordance with another exemplary embodiment of the present disclosure. In certain embodiments, the exemplary gas turbine engine depicted in FIG. 10 may be configured in substantially the same manner as exemplary gas turbine engine described above with reference FIG. 3. Accordingly, the same or similar numbers may refer to the same or similar part. For example, as is depicted, the gas turbine engine is configured as a turbofan engine generally comprising a fan 202 and a core turbine engine 204. The core turbine engine 204 includes an LP compressor 210 connected to an LP turbine 218 through an LP shaft 224, as well as an HP compressor 212 connected to an HP turbine 216 through an HP shaft 222. For the embodiment depicted, the turbofan engine 200 further includes an electric machine 246. The electric machine 246 may be configured in substantially the same manner as one or more of the embodiments described above with reference to FIGS. 4 through 9.

However, as is depicted schematically and in phantom, for the embodiment depicted, the electric machine 246 may be positioned at any other suitable location. For example, the electric machine 246 may be an electric machine 246A coaxially mounted with the LP shaft 224 at a location forward of the HP compressor 212 and substantially radially inward of the LP compressor 210. Additionally, or alternatively, the electric machine 246 may be an electric machine 246B coaxially mounted with the HP shaft 222, e.g., at a location forward of the HP compressor 212. Additionally, or alternatively still, the electric machine 246 may be an electric machine 246C coaxially mounted with the LP shaft 224 a location at least partially aft of the HP turbine 216 and at least partially forward of the LP turbine 218. Additionally, or alternatively still, the electric machine 246 may be an electric machine 246D coaxially mounted with the LP shaft 224 and the HP shaft 222, such that the electric machine 246D is a differential electric machine. Moreover, in still other embodiments, the electric machine 246 may be mounted at any other suitable location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and an axial direction, the gas turbine engine comprising:
   a turbine section;
   a rotary component rotatable with at least a portion of the turbine section;
   a lubrication assembly;

an electric machine coupled to the rotary component at least partially inward of the turbine section along the radial direction;

an electric machine sump in fluid communication with the lubrication assembly for receiving a flow of lubrication fluid from the lubrication assembly; and a cooling system configured to keep the electric machine within a predetermined temperature range.

2. The gas turbine engine according to claim 1, wherein the lubrication assembly is configured as part of the cooling system to cool the electric machine such that the electric machine is maintained within the predetermined temperature range.

3. The gas turbine engine according to claim 2, wherein the lubrication assembly comprises a lubrication oil supply line that provides the flow of lubrication fluid to the electric machine sump, and wherein the lubrication assembly is configured to provide the flow of lubrication oil to the lubrication oil supply line at a temperature less than 275° F.

4. The gas turbine engine according to claim 3, wherein the lubrication assembly comprises a heat exchanger that reduces a temperature of the flow of lubrication oil provided to the lubrication oil supply line.

5. The gas turbine engine according to claim 1, a sealed cavity assembly comprising one or more fluid seals at least partially defining a sealed cavity and configured to prevent the lubrication fluid from the electric machine sump from entering the sealed cavity, wherein the electric machine is enclosed within the sealed cavity.

6. The gas turbine engine according to claim 5, wherein the cooling system comprises a buffer cavity that surrounds at least a portion of the sealed cavity to thermally insulate the electric machine.

7. The gas turbine engine according to claim 1, wherein the electric machine comprises a plurality of permanent magnets, and wherein an entirety of the predetermined temperature range is at least 100° F. below a Curie temperature limit of each of the plurality of permanent magnets.

8. The gas turbine engine according to claim 2, wherein the turbine section partly defines a core air flowpath of the gas turbine engine, wherein the lubrication assembly comprises a lubrication oil supply line that provides the flow of lubrication fluid to the electric machine sump, and wherein the lubrication oil supply line passes through the core air flowpath within a rear frame of the gas turbine engine.

9. A method of operating a gas turbine engine defining a radial direction and an axial direction, wherein the gas turbine comprises a turbine section, and an electric machine at least partially inward of the turbine section along the radial direction, the method comprising:

maintaining, with a cooling system, the electric machine within a predetermined temperature range.

10. The method according to claim 9, wherein the maintaining further comprises:

cooling the electric machine via a lubrication assembly such that the electric machine is maintained within the predetermined temperature range.

11. The method according to claim 10, wherein the maintaining further comprises:

providing a flow of lubrication fluid to a lubrication oil supply line of the lubrication assembly at a temperature less than 275° F.

12. The method according to claim 11, wherein the maintaining further comprises:

flowing the flow of lubrication fluid through a heat exchanger to reduce a temperature of the flow of lubrication oil provided to the lubrication oil supply line.

13. The method according to claim 9, wherein the electric machine is disposed within a seal assembly comprising one or more fluid seals, and wherein at least a portion of the sealed cavity is disposed with a buffer cavity to thermally insulate the electric machine.

14. The method according to claim 9, wherein the electric machine comprises a plurality of permanent magnets, and wherein an entirety of the predetermined temperature range is at least 100° F. below a Curie temperature limit of each of the plurality of permanent magnets.

15. The method according to claim 9, wherein the maintaining further comprises providing a flow of lubrication fluid to a lubrication oil supply line of the lubrication assembly, wherein the turbine section partly defines a core air flowpath of the gas turbine engine, and wherein the lubrication oil supply line passes through the core air flowpath within a rear frame of the gas turbine engine.

16. A gas turbine engine defining a radial direction and an axial direction, the gas turbine engine comprising:

a hot section comprising a turbine section and an exhaust section;

a rotary component rotatable with at least a portion of the turbine section;

a lubrication assembly;

an electric machine coupled to the rotary component at least partially inward of the turbine section along the radial direction;

an electric machine sump in fluid communication with the lubrication assembly for receiving a flow of lubrication fluid from the lubrication assembly; and a cooling system configured to keep the electric machine within a predetermined temperature range.

17. The gas turbine engine according to claim 16, wherein the lubrication assembly is configured as part of the cooling system to cool the electric machine such that the electric machine is maintained within the predetermined temperature range.

18. The gas turbine engine according to claim 17, wherein the lubrication assembly comprises a lubrication oil supply line that provides the flow of lubrication fluid to the electric machine sump, and wherein the lubrication assembly is configured to provide the flow of lubrication oil to the lubrication oil supply line at a temperature less than 275° F.

19. The gas turbine engine according to claim 18, wherein the lubrication assembly comprises a heat exchanger that reduces a temperature of the flow of lubrication oil provided to the lubrication oil supply line.

20. The gas turbine engine according to claim 16, a sealed cavity assembly comprising one or more fluid seals at least partially defining a sealed cavity and configured to prevent the lubrication fluid from the electric machine sump from entering the sealed cavity, wherein the electric machine is enclosed within the sealed cavity.

\* \* \* \* \*